United States Patent
Mohan

(10) Patent No.: US 9,004,785 B1
(45) Date of Patent: Apr. 14, 2015

(54) ADJUSTABLE SHROUD FOR SURVEILLANCE CAMERA

(71) Applicant: Avigilon Corporation, Vancouver (CA)

(72) Inventor: Sudeep Mohan, Vancouver (CA)

(73) Assignee: Avigilon Corporation, Vancouver (CA)

( * ) Notice: Subject to any disclaimer, the term of this patent is extended or adjusted under 35 U.S.C. 154(b) by 0 days.

(21) Appl. No.: 14/098,354

(22) Filed: Dec. 5, 2013

(51) Int. Cl.
G03B 17/00 (2006.01)
H04N 7/18 (2006.01)
G03B 17/56 (2006.01)

(52) U.S. Cl.
CPC .................... *G03B 17/561* (2013.01)

(58) Field of Classification Search
USPC .............. 396/25–29, 427, 535; 348/143, 151, 348/373–374
See application file for complete search history.

(56) References Cited

U.S. PATENT DOCUMENTS

| | | | |
|---|---|---|---|
| 5,563,659 A * | 10/1996 | Bernhardt et al. ............ | 348/373 |
| 6,992,722 B2 | 1/2006 | Jung | |
| D561,808 S | 2/2008 | Arnold et al. | |
| D624,950 S | 10/2010 | Hall, Jr. | |
| 2009/0309968 A1* | 12/2009 | Cheng ........................... | 348/143 |
| 2011/0194184 A1 | 8/2011 | Barton | |

OTHER PUBLICATIONS

Videolarm for Axis Communications, 'Product Instructions' Model 24889,29892; 8 pages; no date.
Axis Communications, 'Axis ACH13HB Outdoor Housing'; datasheet; 2 pages; 2005.
Axis Communications, 'Axis T92A Housing Series'; datasheet; 2 pages; 2013.

* cited by examiner

*Primary Examiner* — Clayton E Laballe
*Assistant Examiner* — Minh Phan
(74) *Attorney, Agent, or Firm* — Klarquist Sparkman, LLP

(57) ABSTRACT

An adjustable shroud assembly for mounting to a surveillance camera comprises a mounting bracket, a cover, and a locking mechanism. The mounting bracket has a base plate fixedly mountable to the camera and at least one pair of opposing resilient squeeze tabs extending outwardly from each side of the base plate; the squeeze tab is laterally movable relative to the base plate between an engaged position and a disengaged position. The cover is slidably mountable to the mounting bracket along a longitudinal direction. The locking mechanism has a first locking portion on the squeeze tab and a second locking portion on the cover. The first and second locking portions interlock when the pair of opposing squeeze tabs are in the engaged position thereby fixing the cover relative to the mounting bracket, and do not interlock when the squeeze tabs are in the disengaged position thereby allowing the cover to slide relative to the mounting bracket.

15 Claims, 9 Drawing Sheets

ADJUSTABLE SHROUD FOR SURVEILLANCE CAMERA

FIELD

This invention relates generally to surveillance cameras, and in particular to surveillance cameras that benefit from shrouding.

BACKGROUND

Shrouds are known for use with surveillance cameras. For example, sun shrouds have been provided for outdoor surveillance cameras. All known existing designs of surveillance camera shrouds either are not lockable against the subject camera, or are lockable using fasteners that require tools to lock, e.g. screws that require use of a screwdriver. Some non-lockable shrouds are adjustable but are typically held in place by a friction engagement; such shrouds tend to move out of position over time, especially when exposed to vibration. Existing lockable shrouds are difficult to adjust as a person needs to precisely position a tool to a screw or other fastener in the shroud; this task is particularly difficult when a surveillance camera is mounted in difficult to access locations, such as in an elevated and/or hidden position.

SUMMARY

According to one aspect of the invention, there is provided an adjustable shroud assembly for mounting to a surveillance camera, and which comprises a mounting bracket, a cover, and a locking mechanism. The mounting bracket has a base plate fixedly mountable to the camera and at least one pair of opposing resilient squeeze tabs, wherein each squeeze tab in the pair extends outwardly from each side of the base plate; the squeeze tab is laterally movable relative to the base plate between an engaged position and a disengaged position. The cover is slidably mountable to the mounting bracket along a longitudinal direction. The locking mechanism has a first locking portion on at least one of the squeeze tabs and a second locking portion on the cover. The first and second locking portions interlock when the squeeze tab is in the engaged position thereby fixing the cover relative to the mounting bracket, and do not interlock when the squeeze tab is in the disengaged position thereby allowing the cover to slide relative to the mounting bracket. Such an adjustable shroud is particularly useful as tools are not required to adjust the shroud on the camera; instead a user can simply grasp the squeeze tabs to disengage the locking mechanism and slide the cover, and release the squeeze tabs to securely lock the cover in place. This is expected to make the task of adjusting the shroud on a camera easier, especially when the camera is mounted in a difficult to access location. In furtherance towards this goal, the squeeze tabs can each further comprise a hand engagement portion, and be spaced laterally apart at a selected width that allows a user to grasp both hand engagement portions with one hand.

The cover can be slidably mountable to the mounting bracket by a sliding mechanism comprising at least one channel longitudinally extending on one of the cover and the mounting bracket, and at least one tab on the other of the cover and the mounting bracket and which slidably engages the at least one channel. More specifically, the sliding mechanism can comprise a pair of channels mounted longitudinally along an inside surface of the cover, and corresponding slider tabs each extending outwardly from each side of the base plate of the mounting bracket.

The first and second locking portions can be rows of teeth, namely a first row of teeth extending longitudinally along the squeeze tab, and a second row of teeth extending longitudinally along an inside surface of the cover. Alternatively, the first locking portion can be one of an embossment and a longitudinally extending row of cavities, and the second locking portion can be the other of the embossment and the longitudinally extending row of cavities.

Each squeeze tab can be provided with a row of teeth, which engage a corresponding row of teeth on the cover; alternatively, only one squeeze tab has a row of teeth, in which case there is provided only one corresponding row of teeth on the cover.

DETAILED DESCRIPTION OF EMBODIMENTS

Directional terms such as "top", "bottom", "front", "back" and "sides" are used in the following description for purpose of providing relative reference only, and are not intended to suggest any limitations on how any article is to positioned during use, or to be mounted in an assembly or relative to an environment. For example, when referencing parts of a shroud assembly in this description, "front" will refer to the part of the shroud assembly that faces a lens-end of a surveillance camera to which the shroud assembly is mounted, "longitudinal" will refer to a direction parallel to the length of the camera, and "lateral" will refer to a direction parallel to the width of the camera.

Embodiments described herein and shown in FIGS. 1 to 9 relate to an adjustable shroud assembly 2 for a surveillance camera, and particularly to a bullet-type surveillance camera having fastener receiving means located on the top of the camera. The shroud assembly 2 comprises a mounting bracket 4 and a cover 6 slidably mountable to the mounting bracket 4, and a locking mechanism 5 that locks the cover 6 in place relative to the mounting bracket 4. The mounting bracket 4 can be aligned with and mounted to the top of the camera via fasteners, and is provided at least two resilient squeeze tabs that are movable between an engaged and disengaged position, wherein the squeeze tabs are moved into their disengaged position when squeezed. The locking mechanism 5 in the described embodiments comprises at least one set of interlocking rows of engagement teeth, wherein each set comprises a first row of engagement teeth on the squeeze tab and a corresponding second row of engagement teeth on the cover 6; the first and second rows of teeth engage (interlock) and disengage when the squeeze tabs are moved between their engaged and disengaged positions. When disengaged, the cover 6 is slidable relative to the mounting bracket 4, thereby allowing the position of the cover 6 to be adjusted relative to the camera; when engaged, the cover 6 is locked in position via the interlocking engagement teeth and without the need for tools.

Figure 1:
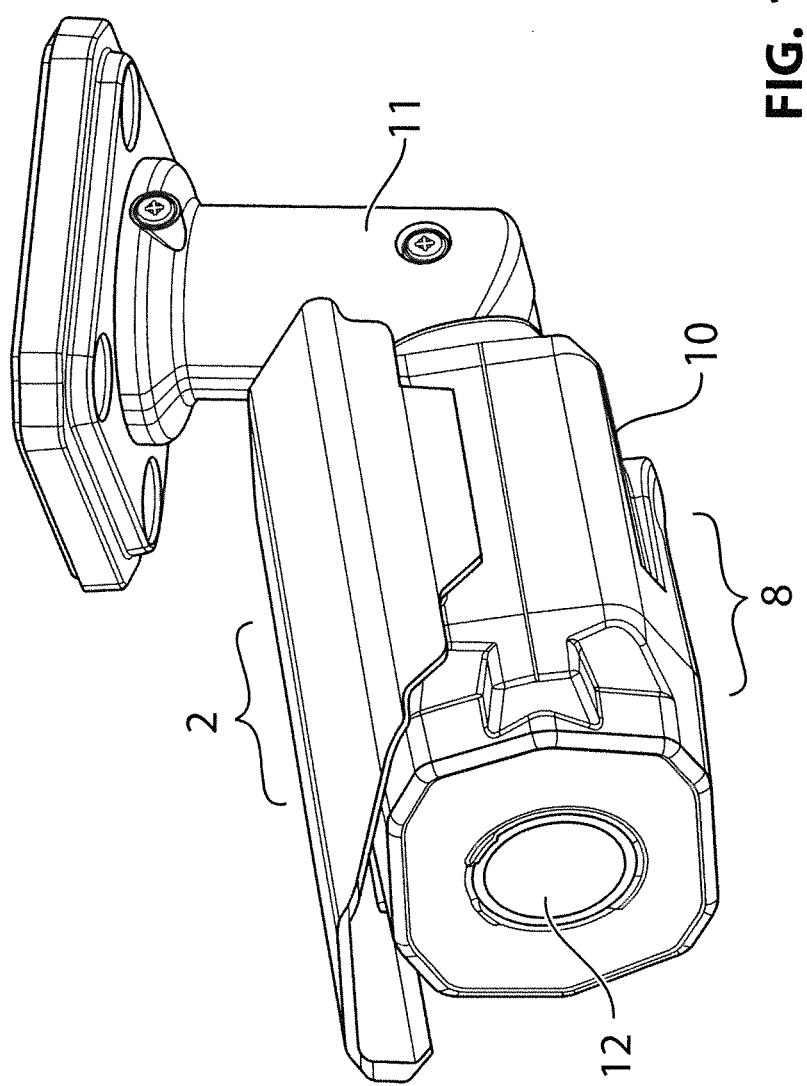
FIG. 1 is perspective view of a bullet-type surveillance camera having mounted thereon an adjustable assembly mounted thereon according to one embodiment of the invention

A typical surveillance camera 8 is shown in FIG. 1, in this case is embodied as a "bullet-type" security camera. This particular type of security camera 8 has a housing 10 which houses camera components, a lens 12 mounted to the front of the camera 10, and a movable mount 11 for mounting the camera 8 to a surface such as a ceiling (not shown). While a bullet-type security camera 8 of the type shown in FIG. 1 can be used with embodiments of the adjustable shroud assembly 2 described herein, it is understood that the adjustable shroud assembly 2 can be used with a variety of different surveillance cameras in a manner that would be known to those skilled in the art.

As will be described in detail below, the adjustable shroud assembly 2 is mountable to the camera 8 via the mounting bracket 4 and the cover 6 is slidable relative to the camera 8 and lockable in place via a locking mechanism 5 comprising interlocking teeth on the mounting bracket 4 and the cover 6.

Figure 2:
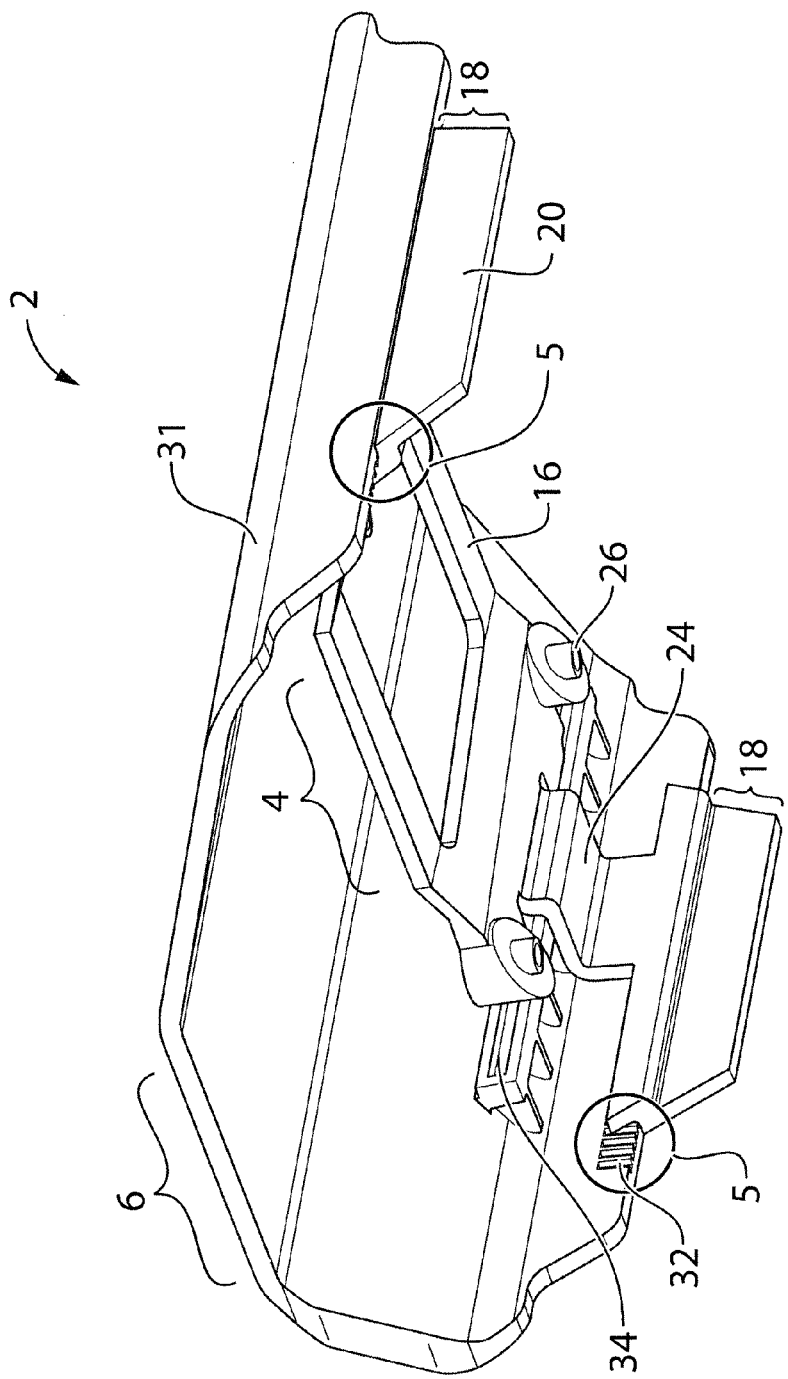
FIGS. 2 to 5 are respectively lower perspective, upper perspective, front, and side views of the adjustable shroud assembly.
Figure 3:
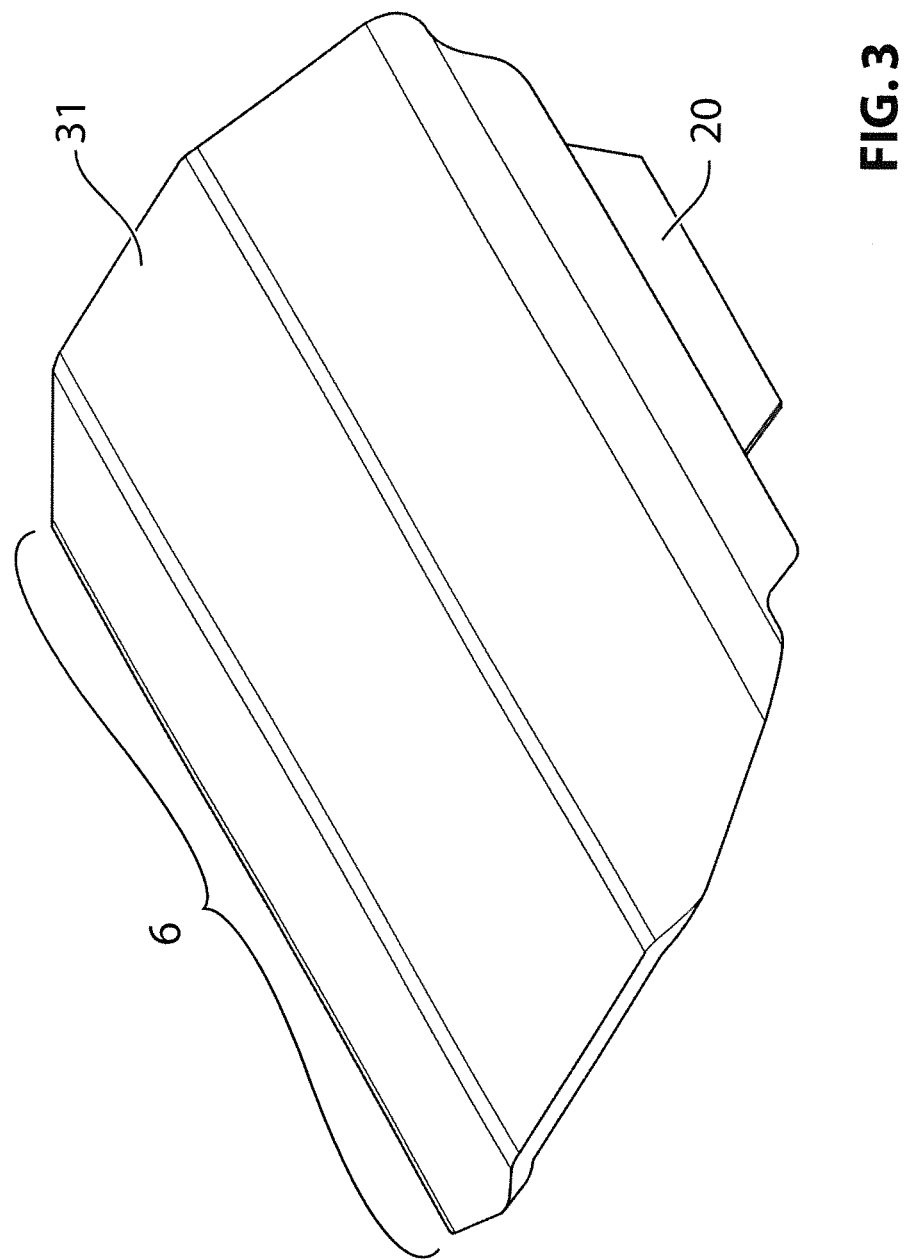
Figure 4:
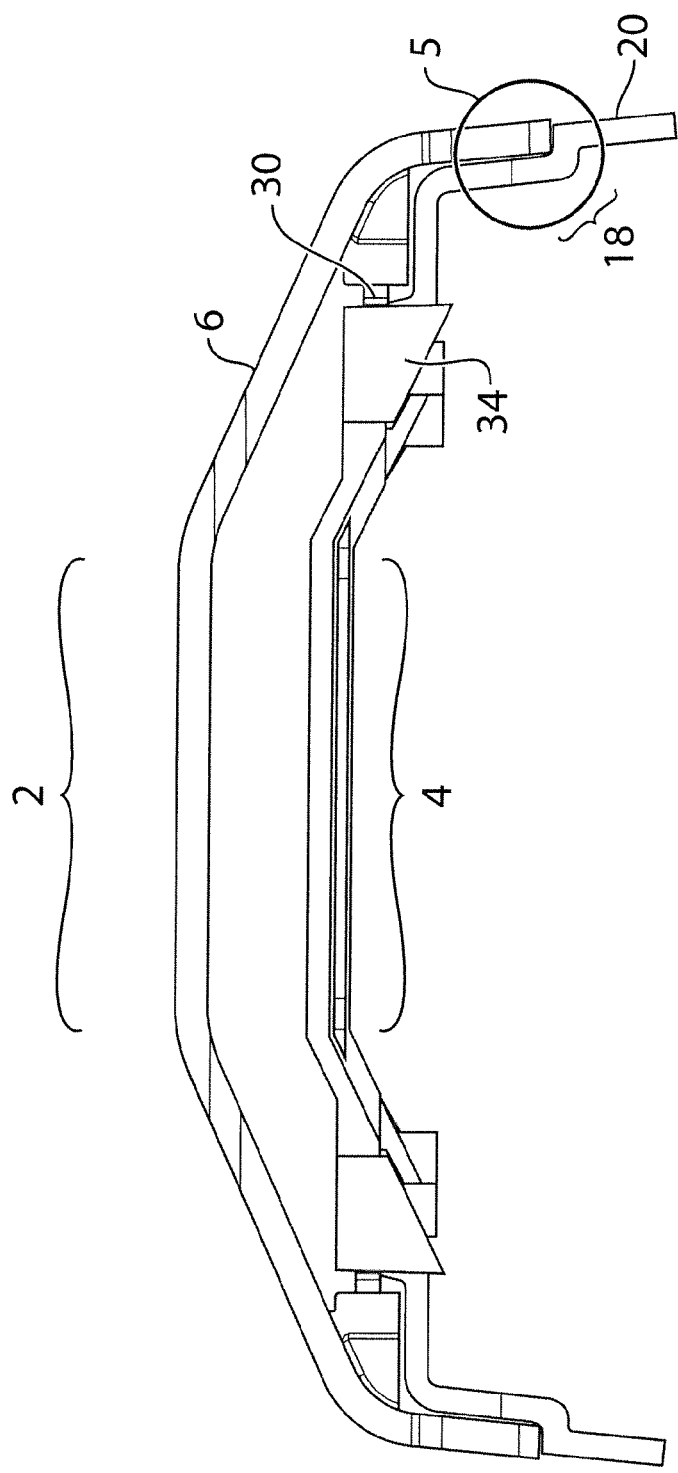
Figure 5:
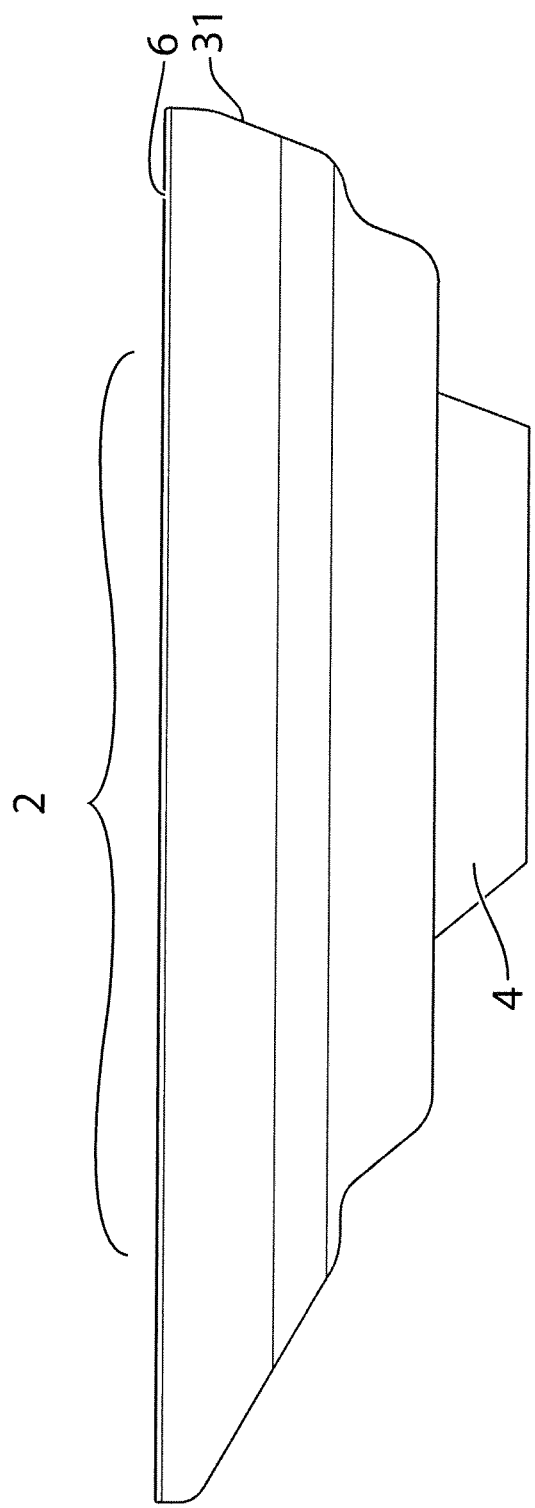
Figure 6:
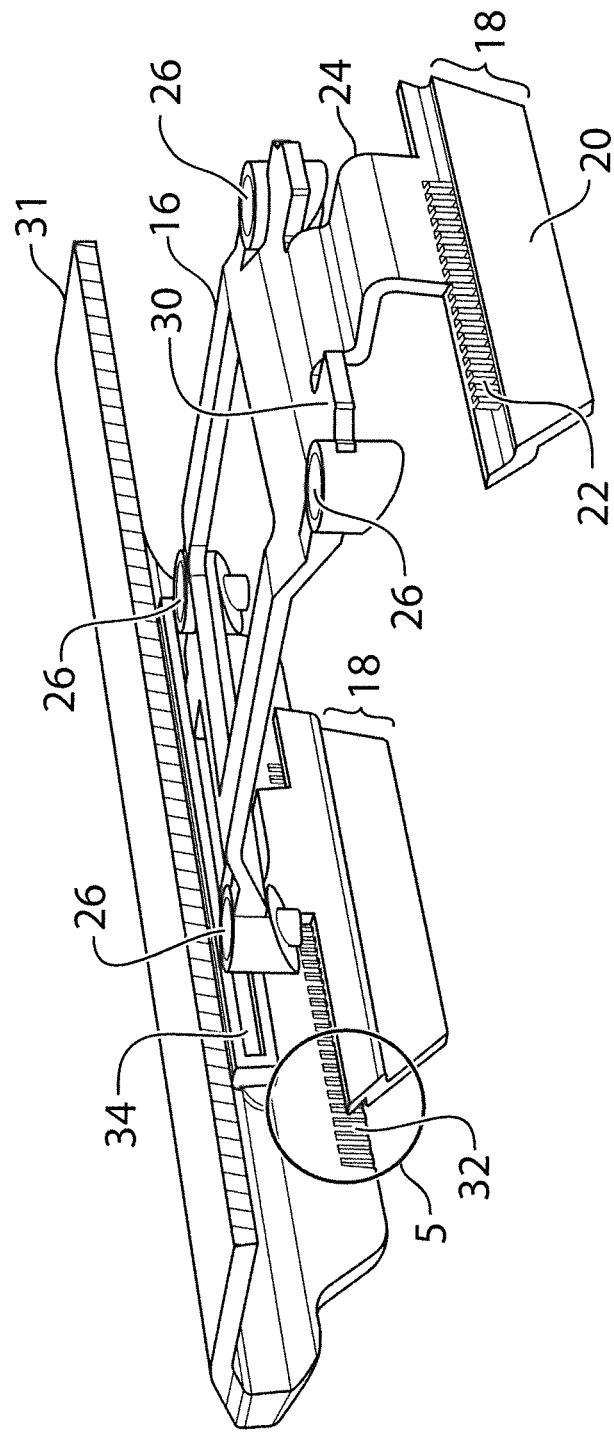
FIG. 6 is a cut-away perspective view of the adjustable shroud assembly.
Figure 7:
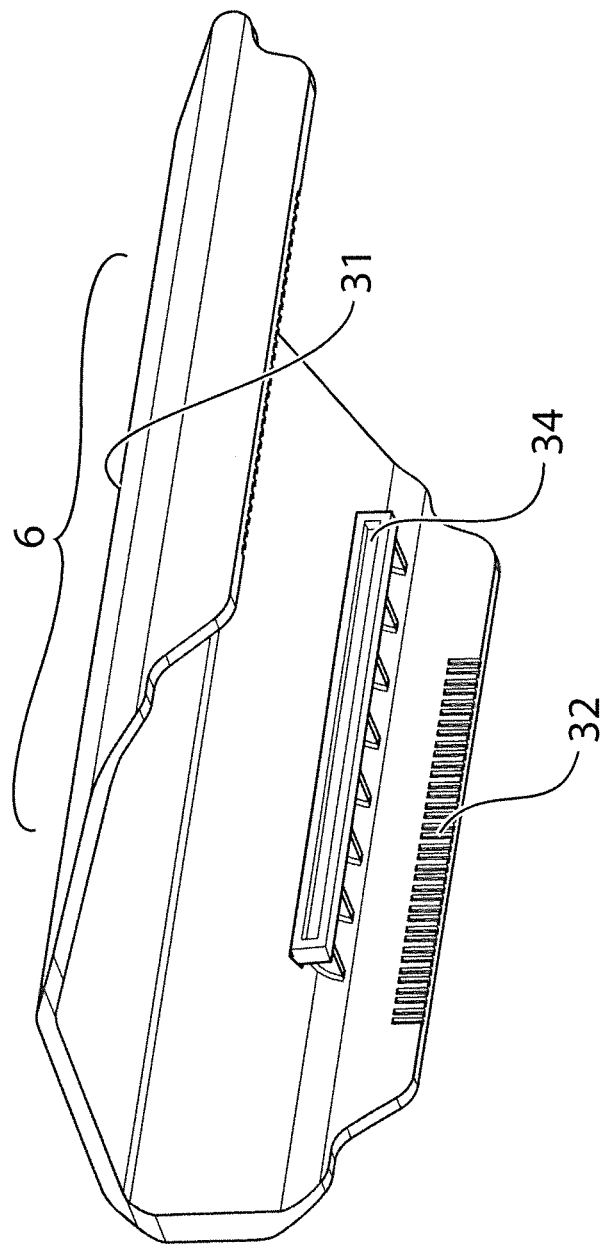
FIG. 7 is a lower perspective views of a cover component of the adjustable shroud assembly.
Figure 8:
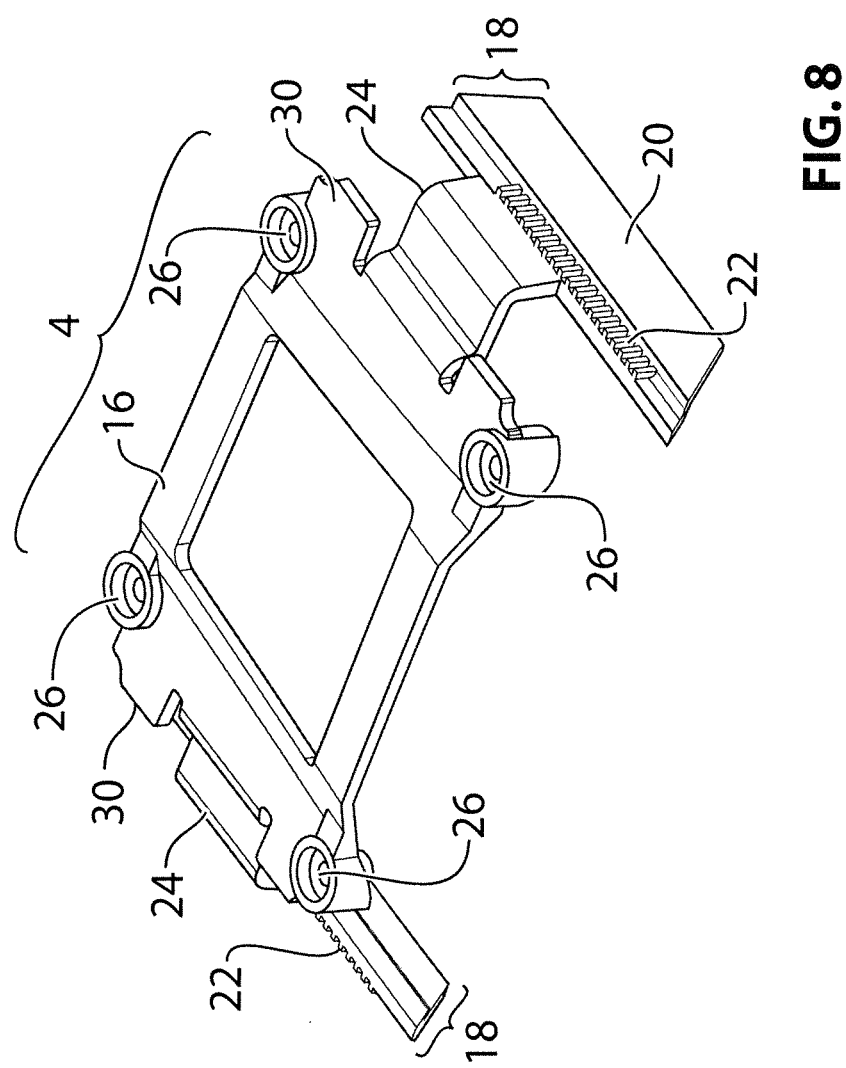
FIG. 8 an upper perspective view of a mounting bracket component of the adjustable shroud assembly.

Referring particularly to FIGS. 2, 6 and 8, the mounting bracket 4 comprises a generally rectangular base plate 16 and a pair of opposing squeeze tabs 18 extending outwardly and downwardly from each side of the base plate 16. Each squeeze tab 18 is provided a hand engagement portion 20, a row of longitudinally-extending and outwardly facing teeth 22 located above the hand engagement portion 20, and arms 24 which connect the hand engagement portion 20 and row of teeth 22 to the base plate 16.

The position of the squeeze tabs 18 relative to the base plate 16 is selected to provide sufficient clearance to span the width of the camera 8 and allow a user to squeeze the tabs 18 inwards, i.e. towards the camera housing 10, enough to disengage the cover 6 from the mounting bracket 4.

In this embodiment, the base plate 16 and squeeze tabs 18 are composed of plastic and are integrally formed, e.g. by injection molding. The material composition and dimensions of the squeeze tabs 18, and particularly of the arms 24, are selected to allow a user to laterally displace the squeeze tabs 18 relative to the base plate 16 with moderate force, and to allow the squeeze tabs 18 to return back to their original position when the force is released, i.e. the squeeze tabs 18 are resilient. Instead of being integrally formed, the squeeze tabs 18 can be separate components that are attached to the base plate 16 by means known to one skilled in the art. Instead of being composed of plastic, the squeeze tabs 18 and/or base plate 16 can be made of a different material which has the aforementioned desired properties, for example, a resilient metal.

The base plate 16 is provided with four holes 26 that receive threaded bolts or screws (not shown) for mating with threaded holes on the top of the camera housing 10 thereby securing the mounting bracket 4 to the camera 8. Alternatively, other fastening means known to one skilled in the art can be used instead of bolts or screws and holes, e.g. adhesive. The hole pattern in the base plate 16 is selected to match the hole pattern in the camera housing 8. This hole pattern can be standardized across different camera models, or in the alternative, the base plate 16 can be comprised of two or more pieces that are movably adjustable relative to each other (not shown) such that the configuration of the hole pattern can be changed to match different hole patterns in different cameras. The base plate 16 further comprises slider tabs 30 that extend outwardly from each side of base plate 16 and above the arms 24 of the squeeze tabs 18. As will be discussed below, the slider tabs 30 are configured to engage and slide within channels of the cover 6.

Referring now to FIGS. 2, 3, 5, 6 and 7, the cover 6 comprises a body 31 that extends generally straight in a longitudinal direction, and that curves downwardly in a lateral direction, such that the shape of the cover 6 generally conforms to the shape of the top of the camera housing 10. The curvature of the body 31 is selected so that the sides are generally perpendicular to the longitudinal direction, and have inside surfaces that face each other.

The cover 6 also comprises a pair of longitudinally-extending and inwardly-facing rows of teeth 32; the rows of teeth 32 are located on the facing inside surfaces of the body 31 and are each positioned to engage and interlock with the respective rows of teeth 22 in the mounting bracket 4 (see in particular FIGS. 2 and 6 which show a pair of interlocking rows of teeth 22, 32).

The cover 6 also comprises a pair of longitudinally-extending and inwardly facing channels 34 that extend from the inside surface of the cover body 31. The positions of the channels 34 and rows of teeth 32 of the cover 6 are selected so that when the cover 6 is attached to the mounting bracket 4, each channel 34 is in sliding engagement with a respective set of slider tabs 30, and each row of teeth 32 of the cover 6 is in interlocking engagement with a respective row of teeth 22 of the mounting bracket 4.

The parts of the cover 6 (i.e. body 31, teeth 32, and channel 34) can be integrally formed as a single piece of plastic by known means such as injection molding. Alternatively one or more parts 31, 32 and 34 can be formed separately and mounted to each other by known means.

The cover 6 is designed to have sufficient flexibility that the cover 6 can flexed enough so that during assembly, the mounting bracket slider tabs 30 can be inserted inside the respective channels 34. The cover 6 can be designed to be more flexible to allow a user to flex the cover using moderate force and to easily remove the cover 6 from the mounting bracket 4.

According to another embodiment (not shown) other locking mechanisms for locking the cover 6 to the mounting bracket 4 can be substituted for the interlocking rows of teeth 22, 32. For instance, one of the cover 6 and mounting bracket 4 can be provided with an embossment, and the other of the cover 6 and mounting bracket 4 can be provided with a row of cavities that can each receive the embossment thereby locking the cover 6 and mounting bracket together 4.

Installation and operation of the adjustable shroud assembly 2 will now be described with reference to FIGS. 1, 9(a) and (b). The mounting bracket 4 is first mounted to the top of the camera 8 by aligning the mounting holes 26 with the respective threaded holes in the top of the camera housing 10 and then inserting the bolts or screws through the mounting holes 26 and threading the bolts or screws into the camera housing threaded holes. Once the mounting bracket 4 is secured in place, the cover 6 is coupled to the mounting bracket 4 by flexing the cover outwardly and then inserting the slider tabs 30 into the respective channels 34 of the cover 6.

Figure 9A:
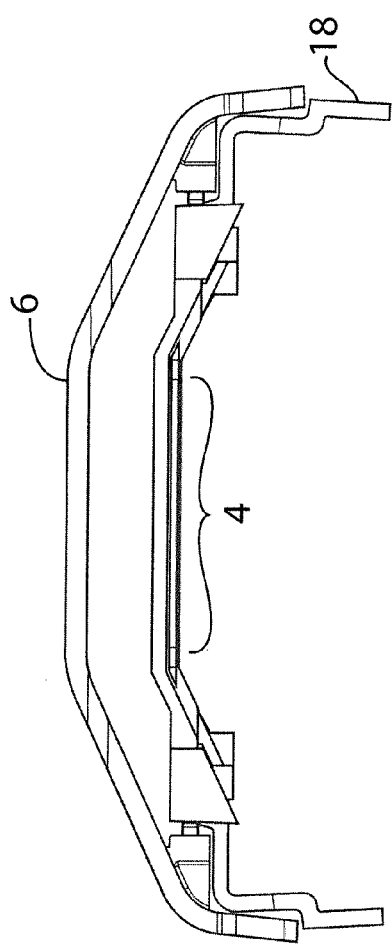
FIGS. 9(a) and (b) are front views of the mounting bracket in an unlocked and locked position relative to the cover.
Figure 9B:
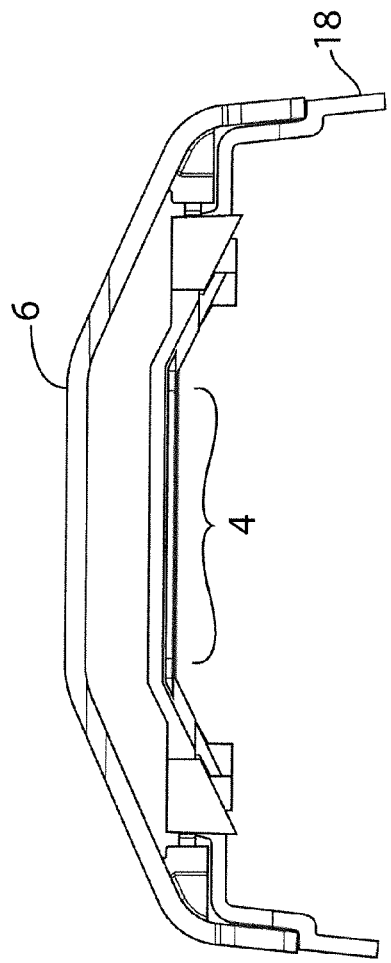

When a user wishes to adjust the position of the cover 6 relative to the camera 8, the user squeezes the squeeze tabs 18 by pushing inwardly on the hand engagement portion 20 of each squeeze tab 18 (see FIG. 9(a)) until the interlocking rows of teeth 22, 32 disengage. Still squeezing the squeeze tabs 18, the user then can slide the cover 6 forwards or backwards relative to the mounting bracket 4 within a range defined by the slider tabs 30 range within their respective channels 34. Once the user is satisfied with the position of the cover 6, the user releases the squeeze tabs 18 and the rows of teeth 22, 32 engage and become interlocked again, thereby securing the cover 6 in place relative to the mounting bracket 4 and camera 8 (see FIG. 9(*b*)).

For surveillance cameras that have a width that is smaller than the span of a typical hand, the adjustable shroud assembly 2 can be configured such that the squeeze tabs 18 are spaced close enough that both tabs 18 can be grasped by a single hand. This allows a user to use one hand to squeeze the tabs 18 together to disengage the locking mechanism and slide the cover 6.

While a particular embodiment of the present invention has been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiment. The invention is therefore to be considered limited solely by the scope of the appended claims.

What is claimed is:

1. An adjustable shroud assembly for mounting to a surveillance camera, comprising:
   (a) a mounting bracket having a base plate fixedly mountable to the camera, and at least one pair of opposing resilient squeeze tabs wherein each squeeze tab in the pair extends outwardly from a side of the base plate, the pair of opposing squeeze tabs being laterally movable relative to the base plate between an engaged position and a disengaged position;
   (b) a cover slidably mountable to the mounting bracket along a longitudinal direction; and
   (c) a locking mechanism having a first row of teeth extending longitudinally along at least one of the squeeze tabs and a second row of teeth extending longitudinally along an inside surface of the cover, wherein the first and second rows of teeth interlock when the pair of opposing squeeze tabs are in the engaged position thereby fixing the cover relative to the mounting bracket, and do not interlock when the pair of opposing squeeze tabs are in the disengaged position thereby allowing the cover to slide relative to the mounting bracket.

2. An assembly as claimed in claim 1 wherein the cover is slidably mountable to the mounting bracket by a sliding mechanism comprising at least one channel longitudinally extending on one of the cover and the mounting bracket, and at least one tab on the other of the cover and the mounting bracket and which slidably engages the at least one channel.

3. An assembly as claimed in claim 2 wherein the sliding mechanism comprises a pair of channels mounted longitudinally along an inside surface of the cover, and corresponding slider tabs each extending outwardly from each side of the base plate of the mounting bracket.

4. An assembly as claimed in claim 1 wherein the squeeze tabs each further comprise a hand engagement portion.

5. An assembly as claimed in claim 4 wherein the squeeze tabs are spaced laterally apart at a selected width that allows a user to grasp both hand engagement portions with one hand.

6. An adjustable shroud assembly for mounting to a surveillance camera, comprising:
   (a) a mounting bracket having a base plate fixedly mountable to the camera, and at least one pair of opposing resilient squeeze tabs wherein each squeeze tab in the pair extends outwardly from a side of the base plate, the pair of opposing squeeze tabs being laterally movable relative to the base plate between an engaged position and a disengaged position;
   (b) a cover slidably mountable to the mounting bracket along a longitudinal direction; and
   (c) a locking mechanism having a one of an embossment and a longitudinally extending row of cavities on at least one of the squeeze tabs and the other of the embossment and the longitudinally extending row of cavities on the cover, wherein the embossment and the longitudinally extending row of cavities interlock when the pair of opposing squeeze tabs are in the engaged position thereby fixing the cover relative to the mounting bracket, and do not interlock when the pair of opposing squeeze tabs are in the disengaged position thereby allowing the cover to slide relative to the mounting bracket.

7. An assembly as claimed in claim 6 wherein the cover is slidably mountable to the mounting bracket by a sliding mechanism comprising at least one channel longitudinally extending on one of the cover and the mounting bracket, and at least one tab on the other of the cover and the mounting bracket and which slidably engages the at least one channel.

8. An assembly as claimed in claim 7 wherein the sliding mechanism comprises a pair of channels mounted longitudinally along an inside surface of the cover, and corresponding slider tabs each extending outwardly from each side of the base plate of the mounting bracket.

9. An assembly as claimed in claim 6 wherein the squeeze tabs each further comprise a hand engagement portion.

10. An assembly as claimed in claim 9 wherein the squeeze tabs are spaced laterally apart at a selected width that allows a user to grasp both hand engagement portions with one hand.

11. An adjustable shroud assembly for mounting to a surveillance camera, comprising:
    (a) a mounting bracket having a base plate fixedly mountable to the camera, and at least one pair of opposing resilient squeeze tabs wherein each squeeze tab in the pair extends outwardly from a side of the base plate, the pair of opposing squeeze tabs being laterally movable relative to the base plate between an engaged position and a disengaged position;
    (b) a cover slidably mountable to the mounting bracket along a longitudinal direction; and
    (c) a locking mechanism having a first locking portion on at least one of the squeeze tabs and a second locking portion on the cover, wherein the first and second locking portions interlock when the pair of opposing squeeze tabs are in the engaged position thereby fixing the cover relative to the mounting bracket, and do not interlock when the pair of opposing squeeze tabs are in the disengaged position thereby allowing the cover to slide relative to the mounting bracket,
    wherein the locking mechanism comprises a pair of first portions each located on a respective squeeze tab and a pair of second portions each for interlocking with a corresponding first portion, and wherein the pairs of first and second portions are rows of teeth, each row of teeth extending longitudinally along the squeeze tab or along an inside surface of the cover.

12. An assembly as claimed in claim 11 wherein the cover is slidably mountable to the mounting bracket by a sliding mechanism comprising at least one channel longitudinally extending on one of the cover and the mounting bracket, and at least one tab on the other of the cover and the mounting bracket and which slidably engages the at least one channel.

13. An assembly as claimed in claim 12 wherein the sliding mechanism comprises a pair of channels mounted longitudinally along an inside surface of the cover, and corresponding slider tabs each extending outwardly from each side of the base plate of the mounting bracket.

14. An assembly as claimed in claim 11 wherein the squeeze tabs each further comprise a hand engagement portion.

15. An assembly as claimed in claim 14 wherein the squeeze tabs are spaced laterally apart at a selected width that allows a user to grasp both hand engagement portions with one hand.

* * * * *